United States Patent
Shinagawa et al.

(10) Patent No.: US 6,883,053 B2
(45) Date of Patent: Apr. 19, 2005

(54) DATA TRANSFER CONTROL CIRCUIT WITH INTERRUPT STATUS REGISTER

(75) Inventors: Noriaki Shinagawa, Tokyo (JP); Shusaku Maeda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 472 days.

(21) Appl. No.: 09/975,323

(22) Filed: Oct. 12, 2001

(65) Prior Publication Data

US 2002/0078287 A1 Jun. 20, 2002

(30) Foreign Application Priority Data

Dec. 5, 2000 (JP) ...................................... 2000-370532

(51) Int. Cl.$^7$ ............................................. G06F 13/24
(52) U.S. Cl. ........................ 710/263; 710/260; 710/262
(58) Field of Search ................................ 710/260–269, 710/106, 48–50, 8; 712/233, 244

(56) References Cited

U.S. PATENT DOCUMENTS

| | | | | |
|---|---|---|---|---|
| 4,420,806 A | * | 12/1983 | Johnson et al. | ............. 710/269 |
| 5,109,513 A | * | 4/1992 | Otsuka | ........................ 710/269 |
| 5,805,929 A | * | 9/1998 | Connolly et al. | ............. 710/49 |
| 5,832,277 A | * | 11/1998 | Sullivan et al. | ............. 710/241 |
| 5,937,199 A | * | 8/1999 | Temple | ........................ 710/262 |
| 6,272,452 B1 | * | 8/2001 | Wu et al. | ...................... 703/24 |
| 6,317,819 B1 | * | 11/2001 | Morton | ........................ 712/22 |
| 6,732,298 B1 | * | 5/2004 | Murthy et al. | ................. 714/34 |

OTHER PUBLICATIONS

"Technical Data on 16550." Byterunner Technologies. Online Oct. 7, 1997. Retrieved from Internet Dec. 7, 2004. <http://web.archive.org/web/19971007042444/http://www-.byterunner.com/16550.html>.*

"UART Details." University of Colorado Electrical and Computer Engineering Department. Online Oct. 8, 1999. Retrieved from Internet Dec. 7, 2004. <http://web.archive.org/web/19991008124827/http://ece-www.colorado.edu/~ecen2120/Manual/uart/UART.html>.*

"Four Port RS–232 Serial PCMCIA Card." Interworld Electronics. Online Jan. 27, 2002. Retrieved from Internet Dec. 7, 2004. <http://web.archive.org/web/20020127022820/http://www.ieci.com.au/products/Product_Page2.asp?Product_ID=90>.*

"The Free On–Line Dictionary of Computing" [entry 'scratch']. Online Dec. 15, 1994. Retrieved Mar. 25, 2004. <http://foldoc.doc.ic.ac.uk/foldoc/foldoc.cgi?query=scratch>.*

* cited by examiner

Primary Examiner—Mark H. Rinehart
Assistant Examiner—Thomas J. Cleary
(74) Attorney, Agent, or Firm—Rabin & Berdo, P.C.

(57) ABSTRACT

A data transfer control circuit includes several data receiver-transmitters, each having an interrupt identification register. Interrupt signals from the data receiver-transmitters are combined into a single interrupt signal by an interrupt controller. One of the data receiver-transmitters has an interrupt status register with bits indicating the logic levels of the interrupt signals from each of the data receiver-transmitters. A host device that receives the interrupt signal from the interrupt controller can read the interrupt status register to determine which data receiver-transmitter caused the interrupt, then read the interrupt identification register of that data receiver-transmitter to identify the interrupt source, without having to search through the interrupt identification registers of other data receiver-transmitters.

5 Claims, 4 Drawing Sheets

DATA TRANSFER CONTROL CIRCUIT WITH INTERRUPT STATUS REGISTER

BACKGROUND OF THE INVENTION

The present invention relates to a data transfer control circuit for transferring data between, for example, a personal computer and a card installed in the personal computer.

A card installed in a personal computer will be referred to below as a PC card. FIG. 1 shows the relevant parts of a conventional PC card 10 and its electrical interconnections to the personal computer (PC) 1. The interconnections are made by mounting the PC card 10 in a socket (not visible) in the personal computer 1.

The interconnections include an address bus 11, a data bus 12, a plurality of control signal lines 13, and an interrupt signal line 14. The address bus 11 supplies address signals SA{10:0} (that is, signals SA10 to SA0) from the socket to an address decoder 15, to a plurality of universal asynchronous receiver-transmitters (UARTs) 16-0, 16-1, . . . , 16-7, and to circuits such as an internal memory or input-output circuit (not visible) in the PC card 10. The address decoder 15 receives and decodes address signals SA{10:3}, thereby generating chip enable signals CE0 to CE7 for the UARTs 16-0 to 16-7. The UARTs 16-0 to 16-7 receive the remaining address signals SA{2:0}. When one of the chip enable signals CE0 to CE7 is active, the corresponding UART is connected to the address bus 11, data bus 12, and control signal lines 13. The UARTs carry out asynchronous serial data transfer.

The UARTs 16-0 to 16-7 all have the same internal structure, including a receive-send data register RSDAT, an interrupt enable register IER, an interrupt identification register IIR, a line control register LCR, a modem control register MCR, a line status register LSR, a modem status register MSR, and a scratch register SCR. These eight registers are selected by address signals SA{2:0}. The selected register can be accessed via the data bus 12 under control of a read control signal RD and a write control signal WR, which are carried on two of the control signal lines 13.

While transmitting or receiving serial data, the UARTs may generate interrupt requests by driving respective interrupt signals INT0, INT1, . . . , INT7 to the low logic level. When requesting an interrupt, a UART indicates the interrupt source (the reason for the interrupt request) by setting a bit or bits in its interrupt identification register IIR.

The above interrupt signals INT0 to INT7 and another interrupt request signal INTR, which originates from other circuitry (not visible) in the PC card 10, are received by an AND gate 17. The AND gate 17 sends a single interrupt signal INT to the personal computer 1 on the interrupt signal line 14. When no interrupt is requested, interrupt signals INT0, . . . , INT7, INTR are all at the high logic level, so the interrupt signal INT output by the AND gate 17 is also at the high logic level. When one of the interrupt signals INT0 , . . . , INT7, INTR goes low to request an interrupt, the interrupt signal INT output from the AND gate 17 also goes low, and the personal computer 1 is notified of the interrupt request. The personal computer 1 then reads the interrupt identification registers IIR in the UARTs in turn to find the UART from which the interrupt request originated, and carries out processing as required by the interrupt.

A problem with this type of PC card is that there is often a delay in responding to an interrupt request, because before the personal computer 1 can identify the interrupt, it may have to read the interrupt identification registers of several UARTs. If the interrupt was caused by the INTR signal, the personal computer 1 must search through the interrupt identification registers of all the UARTs in order to determine that the interrupt request did not originate in any of the UARTs and is therefore due to the INTR signal.

It is also inconvenient that in order to disable interrupts from a plurality of UARTs, the personal computer 1 must access the interrupt enable registers of each of those UARTs.

SUMMARY OF THE INVENTION

An object of the present invention is to enable a host device to determine the source of an interrupt from a data transfer control circuit quickly.

Another object of the invention is to simplify the enabling and disabling of interrupts from the data transfer control circuit.

The invented data transfer control circuit includes a plurality of data receiver-transmitters, and an interrupt controller. Each data receiver-transmitter has a plurality of registers, among which are a data register for storing transmitted and received data, and an interrupt identification register for indicating interrupt sources. The data receiver-transmitters send the interrupt controller respective interrupt signals, from which the interrupt controller generates an interrupt signal for output on an interrupt signal line.

One of the data receiver-transmitters also receives the interrupt signals sent by the plurality of data receiver-transmitters, and has an interrupt status register with bits indicating the logic levels of these interrupt signals.

Another one of the data receiver-transmitters may also have an interrupt mask register with bits for masking interrupts from each of the data receiver-transmitters. The logic levels of these bits are supplied to the interrupt controller.

A host device receiving the interrupt signal from the interrupt controller can check the interrupt status register to determine which data receiver-transmitter requested the interrupt, then check the interrupt identification register of that data receiver-transmitter and find the specific interrupt source quickly, without having to search through the interrupt identification registers of other data receiver-transmitters.

If an interrupt mask register is provided, the host device can use it to enable and disable interrupts from a plurality of data receiver-transmitters with a single register write operation.

DETAILED DESCRIPTION OF THE INVENTION

Figure 1:
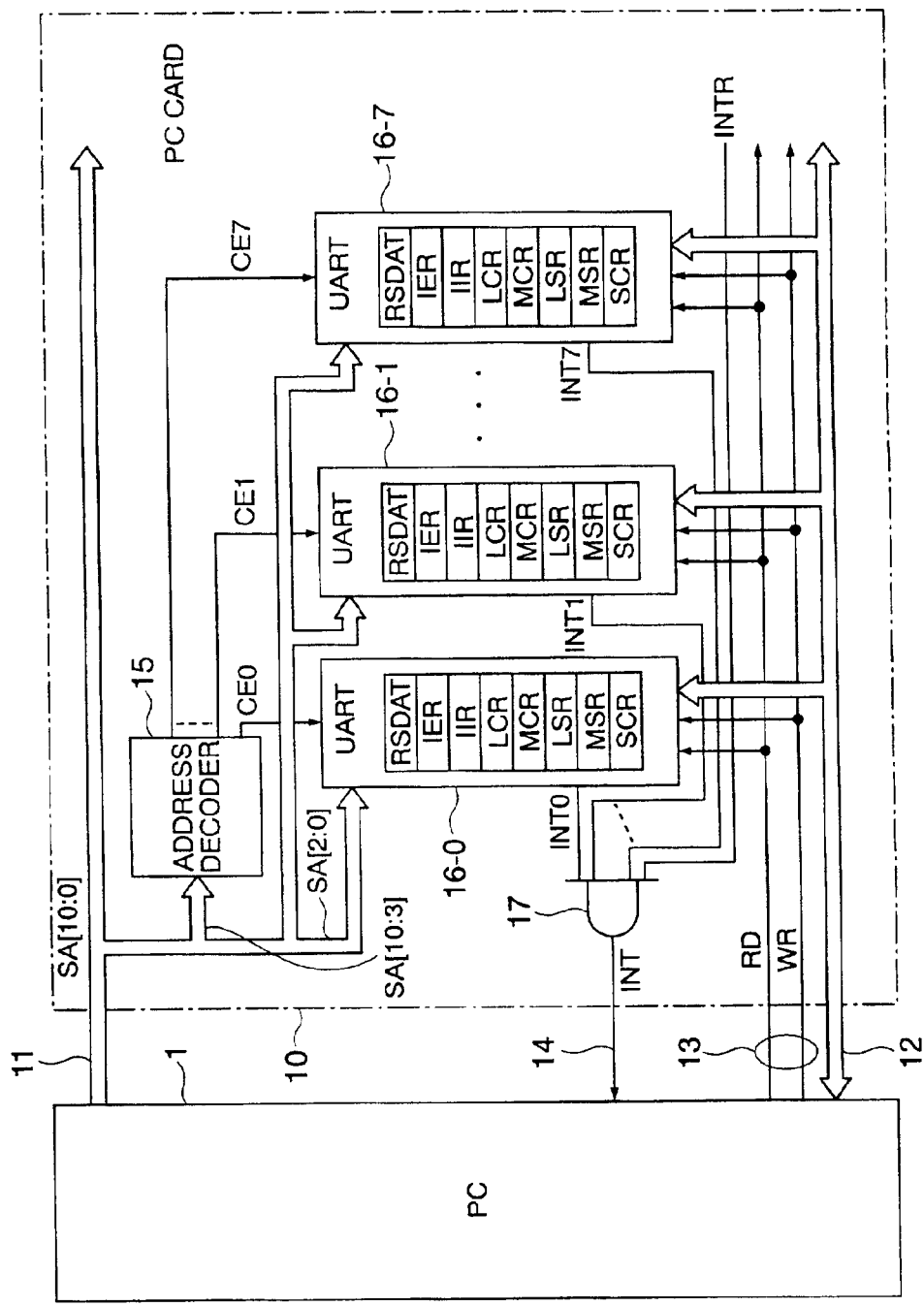
FIG. 1 is a circuit diagram showing relevant parts of a conventional PC card.

Embodiments of the invention will be described with reference to the attached drawings, in which like parts are indicated by like reference characters.

Figure 2:
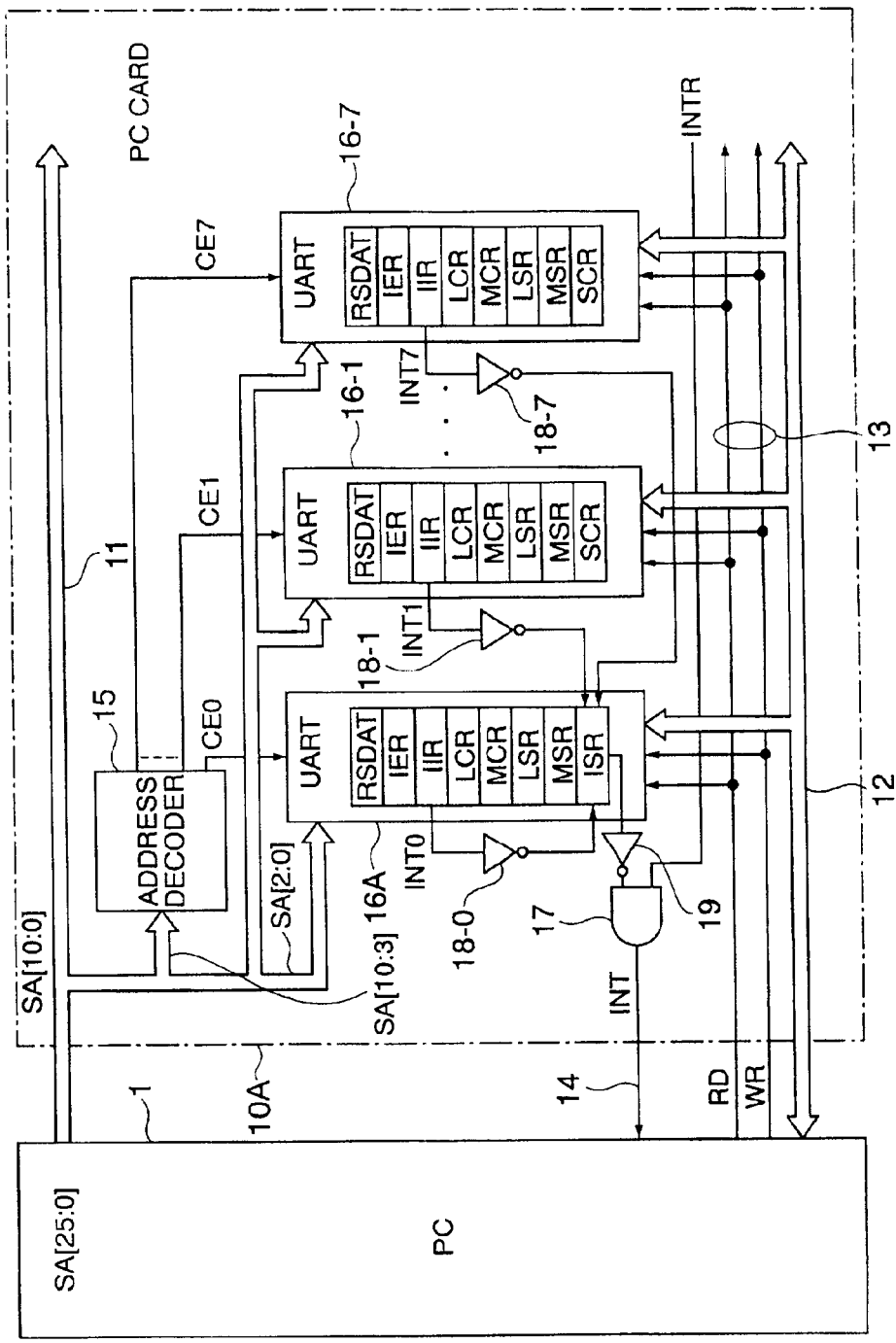
FIG. 2 is a circuit diagram showing relevant parts of a PC card illustrating a first embodiment of the invention.

FIG. 2 shows the relevant circuits of a PC card 10A illustrating a first embodiment of the invention. Like the conventional PC card in FIG. 1, this PC card 10A is installed in a socket (not visible) in a personal computer (PC) 1, to which it is interfaced by an address bus 11, a data bus 12, a plurality of control signal lines 13, and an interrupt signal line 14. The socket supplies address signals SA{25:0}, from among which the address bus 11 supplies address signals SA{10:0} to an address decoder 15, to a plurality of data receiver-transmitters 16A, 16-1, . . . , 16-7, and to other circuits (not visible) in the PC card 10A.

Data receiver-transmitters 16-1 to 16-7 are UART devices similar to the conventional UARTs shown in FIG. 1, each having a receive-send data register RSDAT, an interrupt enable register IER, an interrupt identification register IIR, a line control register LCR, a modem control register MCR, a line status register LSR, a modem status register MSR, and a scratch register SCR. All of these registers are eight-bit registers. Data receiver-transmitter 16A differs from the conventional UART in that its scratch register has been converted to an interrupt status register ISR. The data receiver-transmitters 16A, 16-1, . . . , 16-7 will be referred to as UARTs below.

The receive-send data register RSDAT is used to transfer data one byte at a time in either direction between the personal computer 1 and PC card 10A. The receive-send data register RSDAT is connected to a first-in-first-out (FIFO) buffer (not visible). Data written in the receive-send data register RSDAT are stored sequentially in the FIFO buffer. Data written in the FIFO buffer by other UART circuitry (not visible) can be read out, in the order written, through the receive-send data register RSDAT.

The interrupt enable register IER controls the UART's interrupt sources. The personal computer 1 can enable and disable different interrupt sources within a UART by setting and clearing bits in this register.

The interrupt identification register IIR indicates the source of an interrupt. The personal computer 1 reads this register to analyze the interrupt source and decide how to handle the interrupt.

The line control register LCR specifies various conditions, such as word length and the use of parity bits, under which serial data are transmitted and received. The personal computer 1 sets this register to the desired conditions.

The modem control register MCR is used to control modem operations and modes, such as the loop-back mode. The line status register LSR indicates the status of the FIFO buffer, the presence of errors in serial data, and other status information. The modem status register MSR indicates modem status. The scratch register SCR has no particular function but is available for temporary data storage, and can be written and read by both the personal computer 1 and the PC card 10A.

The eight bits of the interrupt status register ISR in UART 16A are set by the interrupt signals INT0, INT1, INT7 from the UARTs 16A, 16-1, . . . , 16-7, and indicate the inverted logic levels of these signals. The personal computer 1 reads this register to determine which UART is the source of an interrupt.

The address decoder 15 receives and decodes address signals SA{10:3} to generate chip enable signals CE0, CE1, . . . , CE7 for the UARTs 16A, 16-1, . . . , 16-7. When one of the chip enable signals CE0 to CE7 is active, the corresponding UART is connected to the address bus 11, data bus 12, and control signal lines 13, and its registers become accessible from the personal computer 1. The UARTs perform asynchronous serial data transfer according to their register settings.

The registers in a UART are selected by address signals SA{2:0}. Eight-bit data can be written in or read from the selected register via the data bus 12 under control of the read control signal RD and write control signal WR, which are carried on the control signal lines 13. The interrupt signals INT0, INT1, . . . , INT7 are driven to the low logic level by the UARTs 16A, 16-1, . . . , 16-7 during the course of transmitting or receiving serial data, to indicate the occurrence of events enabled as interrupt sources in the interrupt enable registers.

The interrupt signal INT sent from the PC card 10A to the personal computer 1 on the interrupt signal line 14 is generated by the AND gate 17 as follows. The interrupt signals INT0, INT1, . . . , INT7 from the UARTs 16A, 16-1, . . . , 16-7 are inverted by respective inverters 18-0, 18-1, . . . , 18-7, and the inverted interrupt signals set and clear the individual bits of the interrupt status register ISR in UART 16A. The logic levels of these bits are inverted by an eight-bit inverter 19. The inputs to the AND gate 17 are the eight output signals of this inverter 19 and INTR, which is an interrupt request signal from another internal circuit (not visible) in the PC card 10A. The AND gate 17 takes the logical AND of its input signals to generate the interrupt signal INT. The AND gate 17 and inverter 19 thus function as an interrupt controller.

The first embodiment operates as follows.

When no interrupt source in any of the UARTs 16A, 16-1, . . . , 16-7 is active, all of the interrupt signals INT0, INT1, . . . , INT7 are at the inactive (high) logic level, so all bits in the interrupt status register ISR are in the low or '0' state. If INTR is also inactive (high), then all inputs to the AND gate 17 are high, so the interrupt signal INT output by the AND gate 17 is in the inactive (high) state.

If an interrupt request is triggered by some event in one of the UARTs, the corresponding interrupt signal (one of INT0 to INT7) goes low, setting the corresponding bit in the interrupt status register ISR in UART 16A to the '1' state. One of the eight signals output by inverter 19 then goes low, so the interrupt signal INT output by the AND gate 17 goes low, notifying the personal computer 1 that an interrupt has been requested.

The personal computer 1 now reads the interrupt status register ISR. By noting which bit in the interrupt status register ISR is set to '1' the personal computer 1 can tell which UART requested the interrupt. Next, the personal computer 1 reads the interrupt identification register IIR of that UART to identify the specific interrupt source, and performs processing to respond to the interrupt.

The interrupt signal INT output by the AND gate 17 also goes low if interrupt request signal INTR goes low. In this case, when the personal computer 1 reads the interrupt status register ISR, it finds all bits cleared to '1' indicating that the interrupt source is external to the UARTs and must therefore be the INTR signal. The personal computer then performs processing to respond to the INTR interrupt request.

In either case, the personal computer 1 can identify the interrupt source without having to read more than one interrupt identification register IIR. The personal computer 1 can therefore respond to all interrupts quickly, without having to search through multiple interrupt identification registers to find the interrupt source. In particular, the personal computer 1 can respond to the INTR signal without reading any interrupt identification registers, so this interrupt request receives much faster service than in the conventional PC card in FIG. 1.

Compared with the conventional PC card, the first embodiment requires only some additional inverters and a slight internal modification of UART 16A, to enable the bits in the scratch register (now the interrupt status register ISR) to be set by interrupt signals, and to connect these bits to the inverter 19. Since this modification only affects the scratch register, it does not interfere with any inherent UART functions, and no additional address bits are required to select the interrupt status register ISR.

Figure 3:
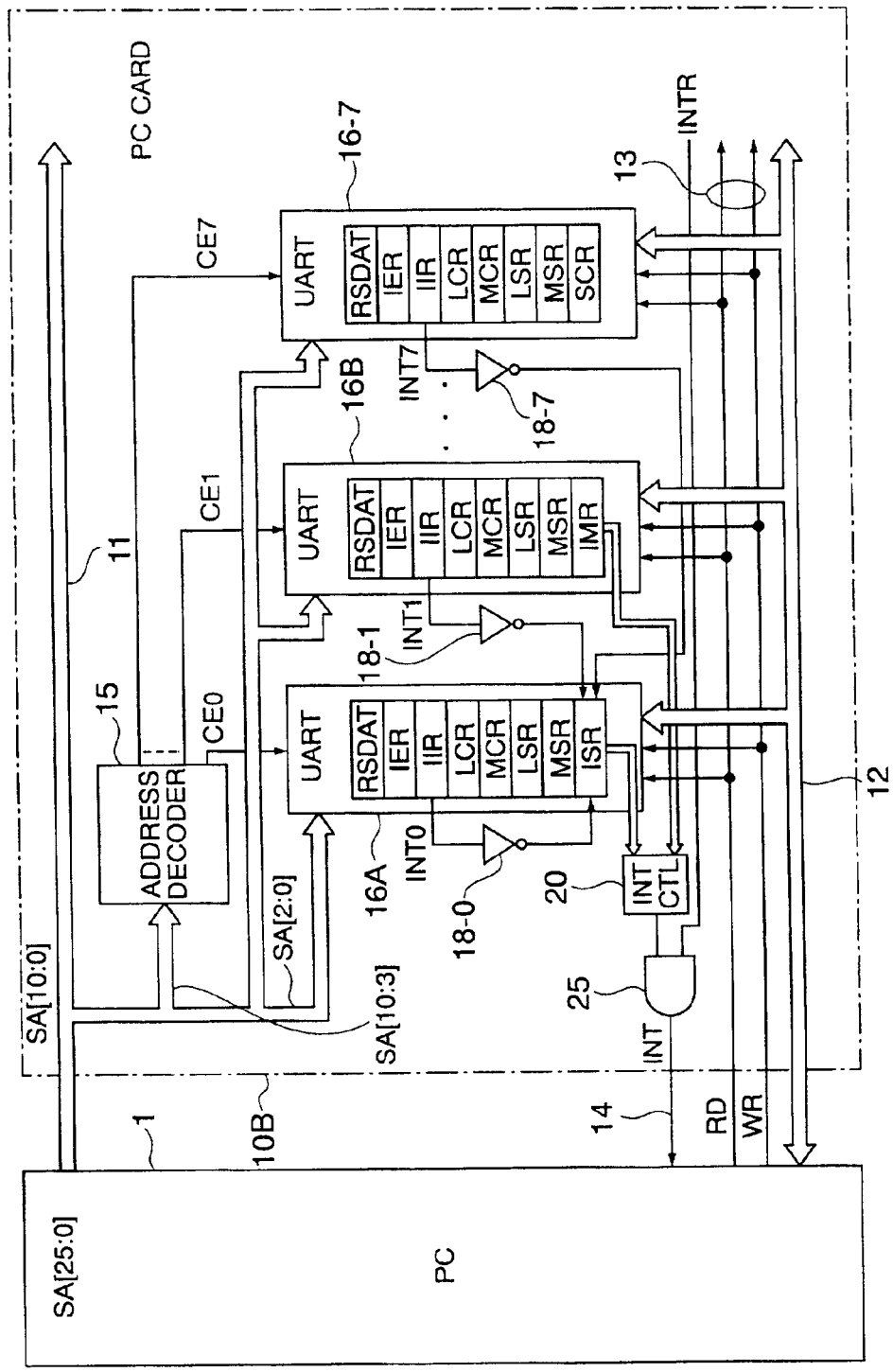
FIG. 3 is a circuit diagram showing relevant parts of a PC card illustrating a second embodiment of the invention.

FIG. 3 shows a PC card illustrating a second embodiment of the invention. This PC card 10B uses the same UART 16A as in the first embodiment, with an interrupt status register ISR, but replaces UART 16-1 of the first embodiment with a differently modified UART 16B. This UART 16B has a conventional receive-send data register RSDAT, interrupt enable register IER, interrupt identification register IIR, line control register LCR, modem control register MCR, line status register LSR, and modem status register MSR, but has an interrupt mask register IMR in place of a scratch register.

The other UARTs 16-2 to 16-7 are of the conventional type. The address bus 11, data bus 12, control signal lines 13, interrupt signal line 14, address decoder 15, and inverters 18-0 to 18-7 operate as described in the first embodiment.

The interrupt mask register IMR is an eight-bit register, the eight bits corresponding to UARTs 16A, 16B, 16-2, . . . , 16-7. When one of these bits is set to '1' interrupts from the corresponding UART are disabled. Only UARTs with bits cleared to '0' in the interrupt mask register can request interrupts of the personal computer 1.

The eight-bit output of the interrupt status register ISR in UART 16A and the eight-bit output of the interrupt mask register IMR in UART 16B are both provided to an interrupt controller (INT CTL) 20. The interrupt controller 20 supplies a single output signal to a two-input AND gate 25. The other input to this AND gate 25 is an interrupt request signal INTR from another internal circuit (not visible) in the PC card 10B. The output of AND gate 25 is the interrupt signal INT sent to the personal computer 1 on the interrupt signal line 14.

Figure 4:
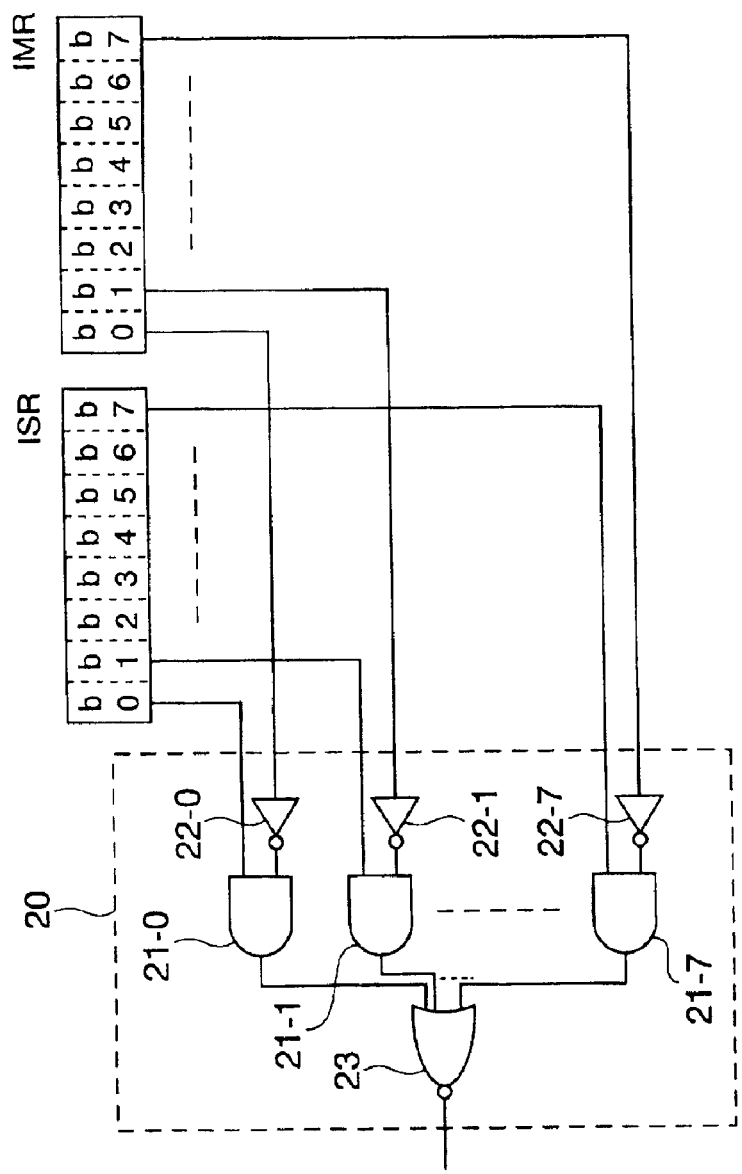
FIG. 4 is a circuit diagram showing an example of the internal structure of the interrupt controller in FIG. 3.

FIG. 4 shows an example of the internal structure of the interrupt controller 20, in which the interrupt controller 20 comprises eight AND gates 21-0 to 21-7, eight inverters 22-0 to 22-7, and an eight-input NOR gate 23. The logic levels of bits b0 to b7 of the interrupt status register ISR are input to respective AND gates 21-0 to 21-7. The logic levels of bits b0 to b7 of the interrupt mask register IMR are inverted by respective inverters 22-0 to 22-7, and the inverted logic levels are input to the corresponding AND gates 21-0 to 21-7. The NOR gate 23 receives the outputs of the AND gates 21-0 to 21-7.

The second embodiment operates as follows.

When no interrupt source in any of the UARTs 16A, 16B, 16-2, . . . , 16-7 is active, all of the interrupt signals INT0, INT1, . . . , INT7 are at the high logic level, so all bits in the interrupt status register ISR are in the '0' state and the outputs of all of the AND gates 21-0 to 21-7 are low. The output of the NOR gate 23 is accordingly high. If the INTR interrupt request signal is also high, then both inputs to the AND gate 25 are high, so the interrupt signal INT output by the AND gate 25 is in the inactive (high) state.

If, for example, an interrupt source is triggered in UART 16A, but the mask bit (b0) of UART 16A is set to '1' in the interrupt mask register IMR, then the output of inverter 22-0 is low, so the output of AND gate 21-0 remains low, the output of NOR gate 23 remains high, and the interrupt signal INT sent to the personal computer 1 remains inactive (high).

If an interrupt source is triggered in UART 16A and the mask bit (b0) of UART 16A is cleared to '0' in the interrupt mask register IMR, then both inputs to AND gate 21-0 are high, so the output of AND gate 21-0 goes high and the output of NOR gate 23 goes low. The output signal INT of AND gate 25 therefore also goes low, notifying the personal computer 1 of an interrupt request.

As in the first embodiment, the personal computer 1 reads the interrupt status register ISR to identify the UART from which the interrupt originates, then reads the interrupt identification register IIR of that UART to identify the specific interrupt source. If all bits in the interrupt status register ISR are cleared to '0' the personal computer 1 recognizes that the interrupt is due to interrupt request signal INTR.

The second embodiment provides the same effects as the first embodiment, with the additional effect that the personal computer 1 can disable all interrupts from a specific UART by setting the corresponding bit in the interrupt mask register IMR, without having to access the interrupt enable register IER of that UART. Accordingly, the personal computer 1 can disable or re-enable interrupts from a plurality of UARTs by a single write operation that sets or clears a plurality of bits in the interrupt mask register IMR.

The preceding embodiments can be modified in various ways, some of which are the following.

The number of UARTs in the PC card is not limited to eight. The invention can be practiced in any PC card having at least two UARTs or other data receiver-transmitters.

The UARTs or other data receiver-transmitters need not all be alike. For example, the PC may include a data receiver-transmitter having a so-called 'doorbell register' for exchanging parallel message data with the personal computer 1.

In the second embodiment, if the number of UARTs is four or less, the first four bits of the scratch register of one of the UARTs can be converted to interrupt status bits, and the second four bits of the same scratch register can be converted to interrupt mask bits, so that only one of the UARTs has to be modified.

The interrupt signals may be active high instead of active low. Corresponding changes should then be made in the logic gates shown in FIGS. 2, 3, and 4.

The logic of the interrupt status register ISR can be reversed so that '0' indicates an interrupt request and '1' indicates that an interrupt is not requested. Similarly, the logic of the interrupt mask register IMR can be reversed so that '0' indicates the masked and '1' the unmasked state. In this case too, corresponding changes should be made in the logic gates shown in FIGS. 2, 3, and 4.

In FIG. 2, inverter 19 can be eliminated, and the interrupt signals INT0, INT1, . . . , INT7 can be input directly to AND gate 17.

Those skilled in the art will recognize that further variations are possible within the scope claimed below.

What is claimed is:

1. A data transfer control circuit including an externally accessible address bus, an externally accessible data bus, an external interrupt signal line, a plurality of data receiver-transmitters, and an interrupt controller, each data receiver-transmitter having a plurality of registers selectively accessible via the address bus and the data bus, the plurality of registers in each said data receiver-transmitter including a data register for storing transmitted data and received data, and an interrupt identification register for indicating interrupt sources, the data receiver-transmitters generating respective internal interrupt signals, the interrupt controller generating an external interrupt signal on the interrupt signal line responsive to the internal interrupt signals generated by the data receiver-transmitters, wherein:

one of the data receiver-transmitters in the plurality of data receiver-transmitters also receives the internal interrupt signals generated by the plurality of data receiver-transmitters, and has, as one of said plurality of registers, an interrupt status register with bits indicating logic levels of said internal interrupt signals.

2. The data transfer control circuit of claim 1, wherein said one of the data receiver-transmitters has a scratch register, the scratch register being used as said interrupt status register.

3. The data transfer control circuit of claim 1, wherein another one of the data receiver-transmitters has, as one of said plurality of registers, an interrupt mask register with bits corresponding to the plurality of data receiver-transmitters, for masking the internal interrupt signals from respective data receiver-transmitters, and supplies the logic levels of the bits in the interrupt mask register to the interrupt controller.

4. The data transfer control circuit of claim 3, wherein said another one of the data receiver-transmitters has a scratch register, the scratch register being used as said interrupt mask register.

5. The data transfer control circuit of claim 1, wherein said interrupt status register also has bits corresponding to the plurality of data receiver-transmitters, for masking the internal interrupt signals from respective data receiver-transmitters, the logic levels of the bits for masking the internal interrupt signals being supplied to the interrupt controller.

* * * * *